United States Patent
Kwon et al.

(10) Patent No.: US 9,617,925 B2
(45) Date of Patent: Apr. 11, 2017

(54) CONTROL METHOD USING CONTINUOUS VARIABLE VALVE DURATION APPARATUS

(71) Applicant: Hyundai Motor Company, Seoul (KR)

(72) Inventors: Kiyoung Kwon, Yongin-si (KR); Ingee Suh, Yongin-si (KR); Kyoung Pyo Ha, Seongnam-si (KR); In Sang Ryu, Incheon (KR); Back Sik Kim, Osan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/947,892

(22) Filed: Nov. 20, 2015

(65) Prior Publication Data
US 2017/0009669 A1 Jan. 12, 2017

(30) Foreign Application Priority Data
Jul. 7, 2015 (KR) .................. 10-2015-0096817

(51) Int. Cl.
*F01L 13/08* (2006.01)
*F02D 13/02* (2006.01)
*F02D 41/00* (2006.01)

(52) U.S. Cl.
CPC .......... *F02D 13/0234* (2013.01); *F01L 13/08* (2013.01); *F01L 2800/09* (2013.01); *F02D 2041/001* (2013.01)

(58) Field of Classification Search
CPC .. F02D 2041/001; F01L 13/08; F01L 2800/09
USPC .......................................... 123/90.15–90.18
See application file for complete search history.

(56) References Cited

U.S. PATENT DOCUMENTS

| | | | | |
|---|---|---|---|---|
| 2013/0000575 A1* | 1/2013 | Park | ...................... | F01L 1/3442 123/90.15 |
| 2013/0146006 A1* | 6/2013 | Kim | ...................... | F01L 1/0532 123/90.17 |
| 2014/0172271 A1* | 6/2014 | Han | ...................... | F02D 13/0219 701/102 |
| 2016/0169057 A1* | 6/2016 | Kwon | ...................... | F01L 1/34 123/90.17 |

FOREIGN PATENT DOCUMENTS

| | | |
|---|---|---|
| JP | 6-185321 A | 7/1994 |
| JP | 10-2249 A | 1/1998 |
| JP | 2012-197770 A | 10/2012 |

(Continued)

*Primary Examiner* — Erick Solis
(74) *Attorney, Agent, or Firm* — Morgan, Lewis & Bockius LLP

(57) ABSTRACT

A control method using a continuous variable valve duration apparatus may use a continuous variable valve duration apparatus including a wheel being mounted on a camshaft and having a wheel key to control duration of an intake valve of an engine, a cam device having a cam and a cam key, being adapted that the camshaft is inserted thereinto, and being disposed to can vary relative phase of the cam with respect to the camshaft, an inner bracket being connected with the wheel key and the cam key, a slider housing being adapted that the inner bracket is rotatably inserted thereinto and being disposed to can move vertically with respect to the engine, a controller varying a position of the slider housing to adjust rotation center of the inner bracket, and guide device guiding motion of the sliding housing.

5 Claims, 7 Drawing Sheets

(56) References Cited

FOREIGN PATENT DOCUMENTS

| JP | 2013-124623 A | 6/2013 |
|----|---------------|--------|
| JP | 5434243 B2 | 3/2014 |
| KR | 10-1999-0063947 A | 7/1999 |

* cited by examiner

CONTROL METHOD USING CONTINUOUS VARIABLE VALVE DURATION APPARATUS

CROSS-REFERENCE TO RELATED APPLICATION

The present application claims priority to and the benefit of Korean Patent Application No. 10-2015-0096817 filed on Jul. 7, 2015, the entire contents of which is incorporated herein for all purposes by this reference.

BACKGROUND OF THE INVENTION

Field of the Invention

The present invention relates to a control method using a continuous variable valve duration apparatus. More particularly, the present invention relates to a control method using a continuous variable valve duration apparatus which can change opening duration of a valve with a simple configuration in accordance with operational states of an engine.

Description of Related Art

Generally, internal combustion engines generate power by receiving and burning air and fuel in a combustion chamber. An intake valve is operated by a camshaft, and air is charged into the combustion chamber while the intake valve is open. An exhaust valve is also operated by the camshaft, and air is discharged from the combustion chamber while the exhaust valve is open.

Optimal operation of the intake valve/exhaust valve, however, depends on the RPM of the engine. That is, an appropriate time for lifting or opening/closing the valves depends on the RPM of the engine. In order to implement an appropriate valve operation in accordance with the RPM of the engine, as described above, a CVVL (Continuously Variable Valve Lift) apparatus that has a plurality of shapes of cams operating valves or operates valves at different lifts in accordance with the RPM of an engine has been studied.

A CVVT (Continuous Variable Valve Timing) technique has been developed to adjust the opening duration of a valve, in which the timing of opening/closing a valve are simultaneously changed with the valve duration being fixed.

However, the CVVL or the CVVT has a problem in that the configuration is complicated and the manufacturing cost is high. Meanwhile, there is a limit in preventing knocking of an engine using the CVVT.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method using a continuous variable valve duration apparatus having advantages of being able to adjust duration of a valve lift in accordance with the operational states of an engine.

A control method using a continuous variable valve duration apparatus according to an exemplary embodiment of the present invention may use a continuous variable valve duration apparatus which includes a wheel being mounted on a camshaft and having a wheel key so as to control duration of an intake valve of an engine, a cam device having a cam and a cam key, being adapted that the camshaft is inserted thereinto, and being disposed so as to can vary relative phase of the cam with respect to the camshaft, an inner bracket being connected with the wheel key and the cam key, a slider housing being adapted that the inner bracket is rotatably inserted thereinto and being disposed so as to can move vertically with respect to the engine, a controller varying a position of the slider housing so as to adjust rotation center of the inner bracket, and guide device guiding motion of the sliding housing. The control method may include: calculating and learning a target effective compression ratio of the engine to prevent knocking by the controller when knocking of engine is occurred; mapping an effective compression ratio of the engine in accordance with duration of the intake valve by the controller; setting a target valve duration for realizing the target effective compression ratio by the controller; and controlling duration of the intake valve according to the set target valve duration by the controller.

The setting of the target valve duration may be performed on the basis of a map about relation between duration of the intake valve and an effective compression ratio of the engine.

The learning of the target effective compression ratio may be performed through experiments and the value of the learned target effective compression ratio may be stored to the controller.

The mapping of relation between the duration of the intake valve and the effective compression ratio of the engine may be performed through experiments and the mapped map about relation between the duration of the valve and the effective compression ratio of the engine may be stored to the controller.

The control method may be ended when the engine enters a normal operation state where knocking is not expected.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
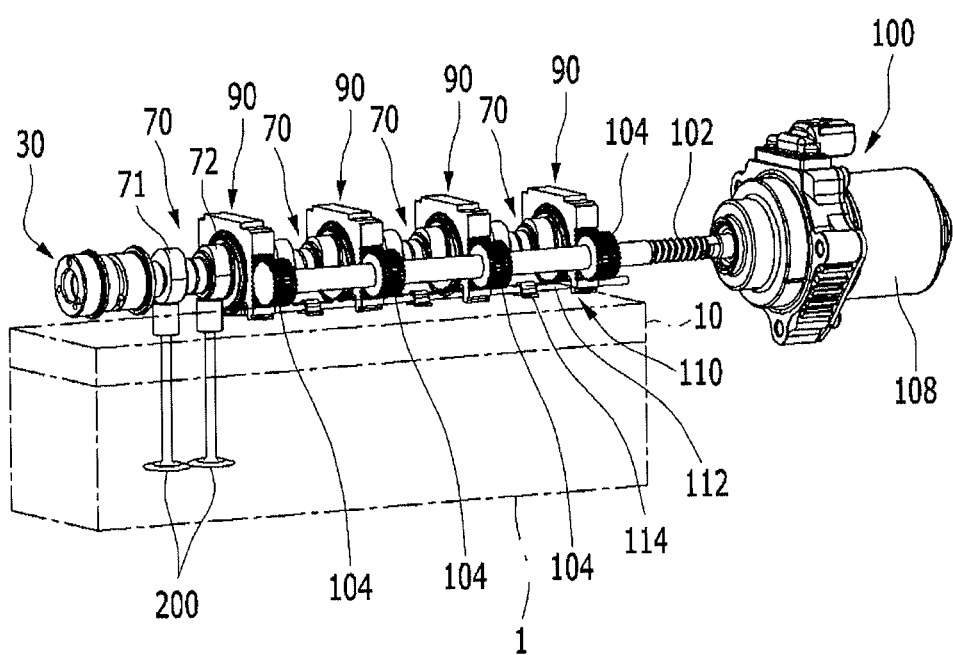
FIG. 1 is a perspective view an engine equipped with a continuous variable valve duration apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention Like reference numerals are given to like components throughout the specification.

Throughout the specification, unless explicitly described to the contrary, the word "comprise" and variations such as "comprises" or "comprising" will be understood to imply the inclusion of stated elements but not the exclusion of any other elements An exemplary embodiment of the present invention will hereinafter be described in detail with reference to the accompanying drawings.

Figure 2:
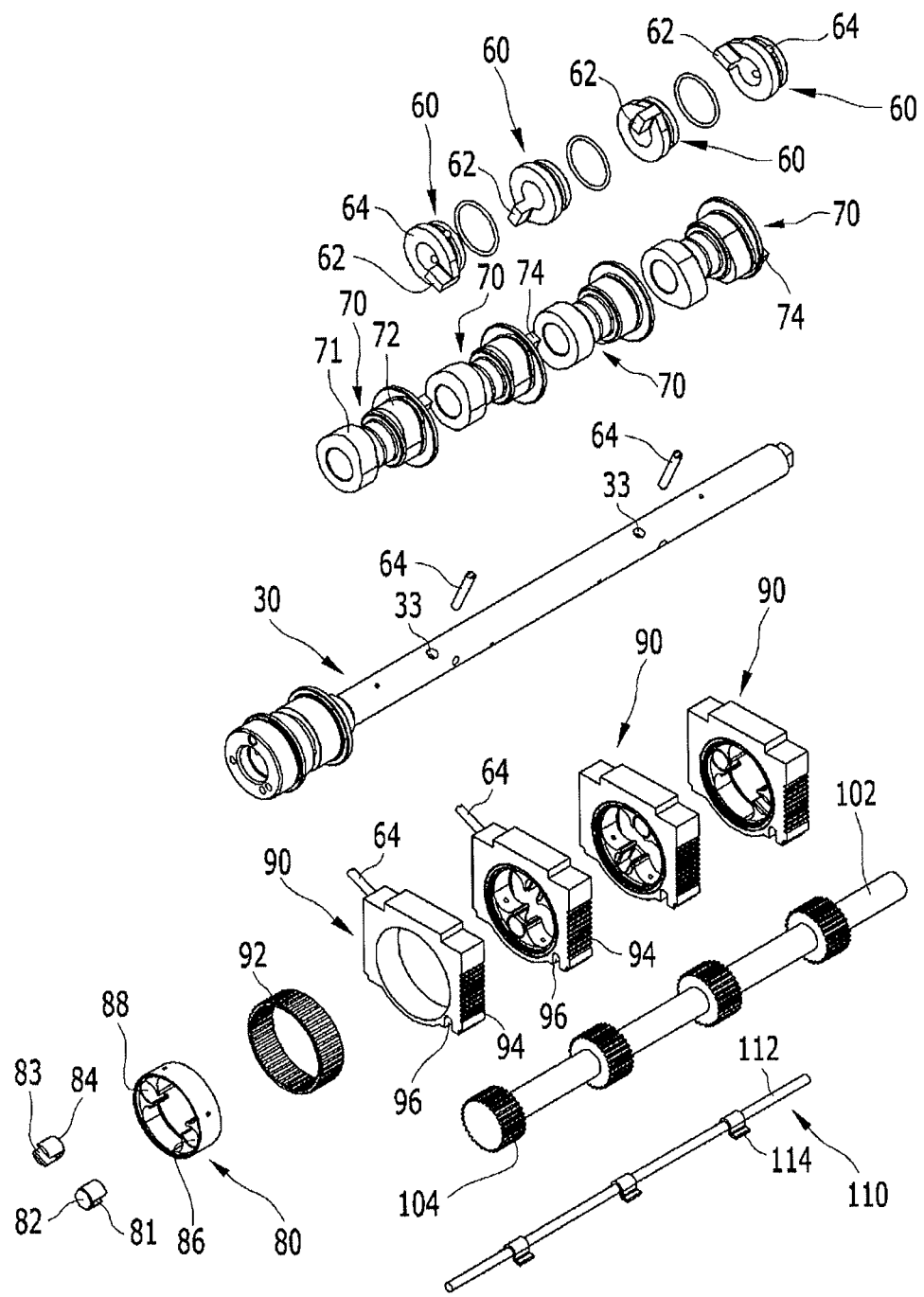
FIG. 2 is an exploded perspective view of the continuous variable valve duration apparatus according to an exemplary embodiment of the present invention.
Figure 3:
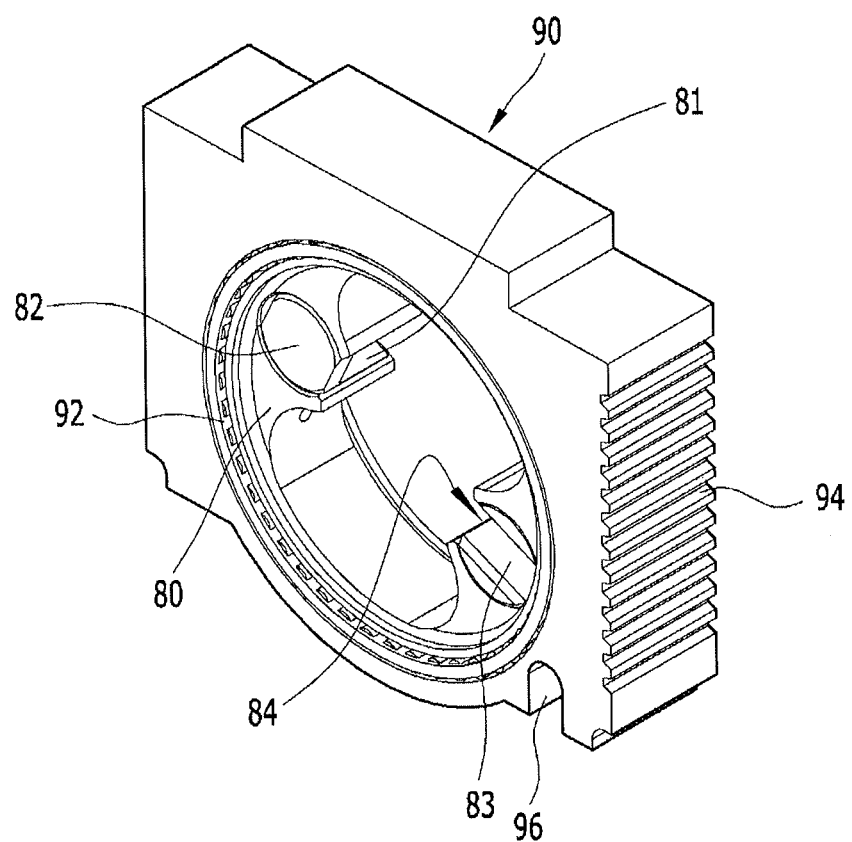
FIG. 3 and FIG. 4 are partial exploded perspective views of the continuous variable valve duration apparatus according to an exemplary embodiment of the present invention.
Figure 4:
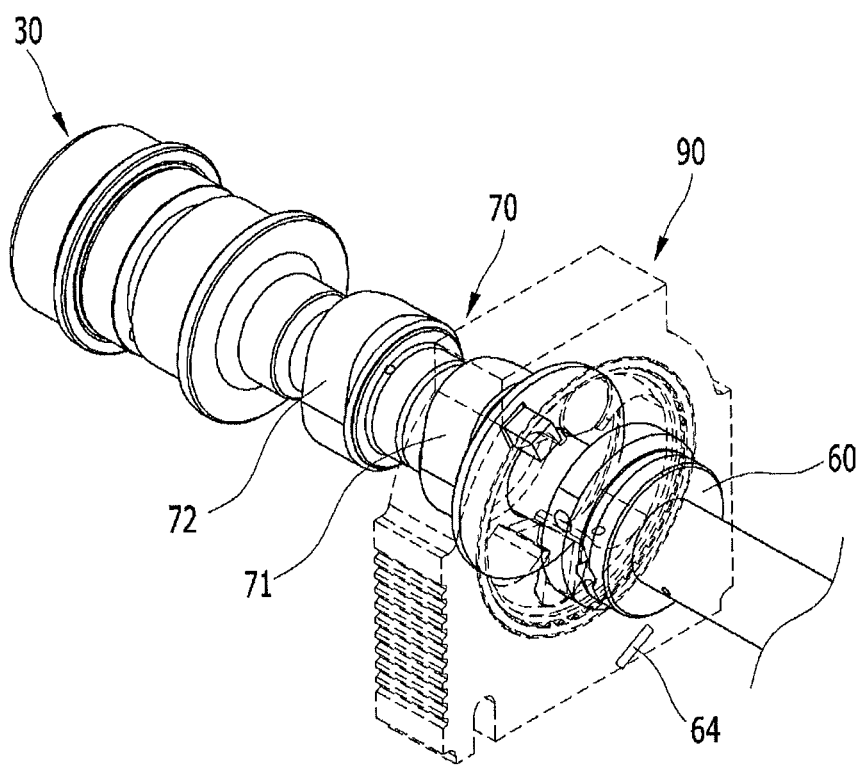

FIG. 1 is a perspective view an engine equipped with a continuous variable valve duration apparatus according to an exemplary embodiment of the present invention, FIG. 2 is an exploded perspective view of the continuous variable valve duration apparatus according to an exemplary embodiment of the present invention, and FIG. 3 and FIG. 4 are partial exploded perspective views of the continuous variable valve duration apparatus according to an exemplary embodiment of the present invention.

Referring to FIG. 1 to FIG. 4, an engine according to an exemplary embodiment of the present invention includes an engine block 1, a cylinder head 10 mounted on the engine block 1, and a continuous variable valve duration apparatus that is mounted on the cylinder head 10.

Referring to FIG. 1 to FIG. 4, according to an exemplary embodiment of the present invention, the continuous variable valve duration apparatus includes: a camshaft 30, a plurality of wheels 60 mounted on the camshaft 30, each having a wheel key 62, and corresponding to cylinders, respectively, a plurality of cam devices 70 having cams 71 and 72 and a cam key 74, in which the camshaft 30 is inserted, that have variable relative phases of the cams 71 and 72 with respect to the camshaft 30, and correspond to the cylinders, respectively, a plurality of inner brackets 80 that are connected to the wheel keys 62 and the cam keys 74, a plurality of slider housings 90 in which the inner brackets 80 are rotatably inserted and that can move vertically with respect to the engine, a controller 100 that adjusts the positions of the rotational centers of the inner brackets 80 by changing the positions of the slider housings 90, and a guide device 110 that guides the slider housings 90, according to an exemplary embodiment of the present invention includes an engine block 1, a cylinder head 10 mounted on the engine block 1, and a continuous variable valve duration apparatus that is mounted on the cylinder head 10.

The camshaft 30 may be an intake camshaft or an exhaust camshaft.

Although two cams 71 and 72 are provided in the drawings, the present invention is not limited thereto.

The cams 71 and 72 open/close a valve 200.

Fastening holes 33 are formed at the camshaft 30, and the wheels 60 can be combined with the camshaft 30 by connecting pins 64. Coupling springs 66 are mounted on the wheels 60, so they can prevent separation of the connecting pins 64.

The continuous variable valve duration apparatus further includes first pins 82 having a sliding key slot 81 in which the wheel key 62 is slidably inserted and second pins 84 having a sliding key slot 83 in which the cam key 74 is slidably inserted, and the inner bracket 80 has first and second pin holes 86 and 88 in which the first pin 82 and the second pin 84 are inserted, respectively.

The first and second pins 82 and 84 have the shape of a cylinder and are rotatably inserted in the first and second pin holes 86 and 88.

Accordingly, since the first and second pins 82 and 84 and the first and second sliding pin holes 86 and 88 are formed in the shape of a cylinder, abrasion resistance can be improved.

Further, productivity can be secured by the simple shape of the first and second pins 82 and 84 and the first and second sliding pin holes 86 and 88.

The sliding key slots 81 and 83 of the first and second pins 82 and 84 are formed in opposite directions, and the wheel key 62 and the cam key 74 can be inserted therein.

The first and second pin holes 86 and 88 may be partially open in order to not interfere with movement of the wheel key 62 and the cam key 72.

A needle bearing 92 may be disposed between the slider housing 90 and the inner bracket 80, so the slider housing 90 and the inner bracket 80 can easily rotate relative to each other and rigidity can be secured.

Control teeth 94 is formed on a side of each of the slider housings 90, and the controller 100 includes a control shaft 102 that is parallel with the camshaft 30 and has control gears 104 engaged with the control teeth 94, and a motor 108 that selectively rotates the control shaft 102.

The guide device 110 includes a guide bar 112 guiding the slider housings 90 and guide brackets 114 fixing the guide bar 112, and a guide slot 96 in which the guide bar 112 is inserted is formed in the slider housings 90.

Figure 5:
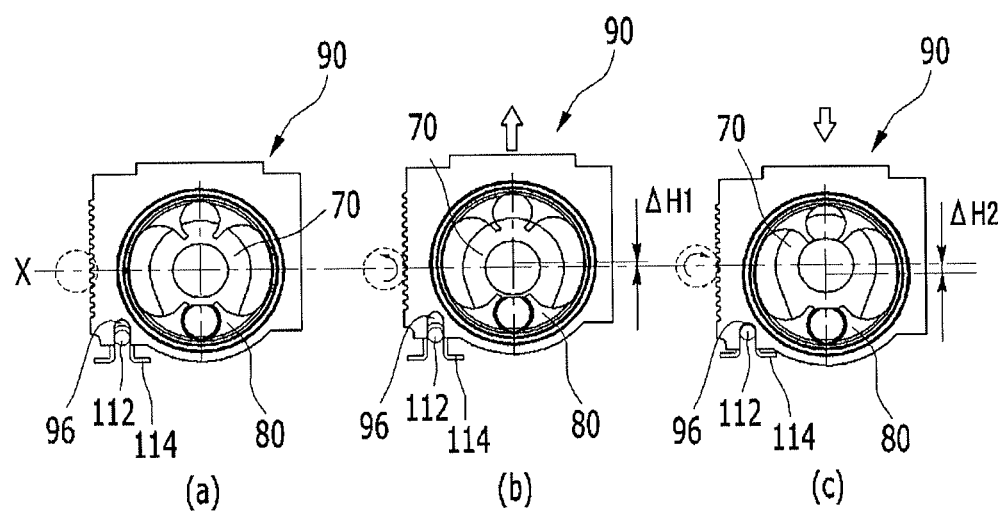
FIG. 5 is a view illustrating the operation of the continuous variable valve duration apparatus according to an exemplary embodiment of the present invention.
Figure 6:
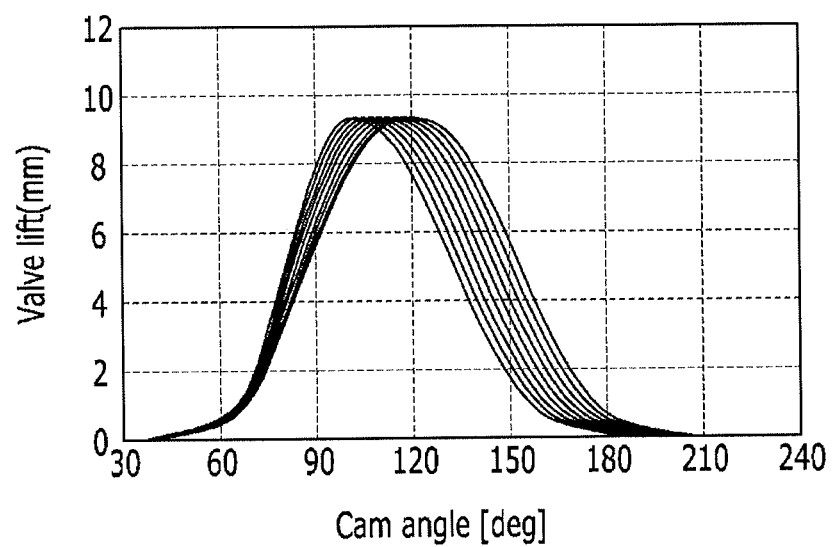
FIG. 6 is a graph showing a valve profile of the continuous variable valve duration apparatus according to an exemplary embodiment of the present invention.

FIG. 5 is a view illustrating the operation of the continuous variable valve duration apparatus according to an exemplary embodiment of the present invention, and FIG. 6 is a graph showing a valve profile of the continuous variable valve duration apparatus according to an exemplary embodiment of the present invention.

Hereinafter, the operation of the continuous variable valve duration apparatus according to an exemplary embodiment of the present invention is described with reference to FIG. 1 to FIG. 6.

In accordance with the operational states of an engine, the motor 108 of the controller 100 operates and changes the relative positions of the slider housings 90.

The first and second pin holes 86 and 88 For example, in (a) of FIG. 5, as the motor 108 operates, the control shaft 102 rotates, so when the position of the slider housing 90 changes upward, the rotational center of the inner bracket 80 moves by ΔH1, as in (b) of FIG. 5, or when the position of the slider housing 90 changes downward, the rotational center of the inner bracket 80 moves by ΔH2, as in (c) of FIG. 5 may be partially open in order to not interfere with movement of the wheel key 62 and the cam key 72.

As the position of the rotational center of the inner bracket 80 changes, the rotational acceleration of the cam device 70 changes and valve duration changes accordingly.

As shown in FIG. 6, the maximum lift of the valve 200 is constant, and as the position of the slider housing 90 changes, the relative rotational speed of the cams 71 and 72 to the camshaft 30 changes, the timing for opening/closing the valve 200 change, and accordingly, the duration of the valve 200 changes. In order to control an effective compression ratio of an engine, it may be possible to adjust duration to change the timing of closing an intake valve while maintaining an MBT (Minimum spark advance for Best Torque) where the maximum torque is obtained. The duration is controlled by the motor 108, and accordingly, responsiveness can be secured.

Figure 7:
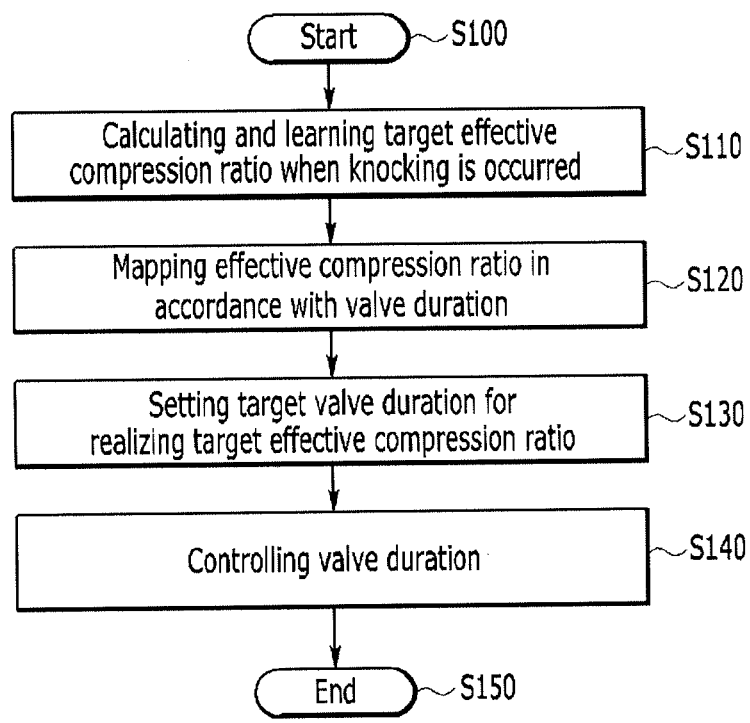
FIG. 7 is a flowchart illustrating a control method using the continuous variable valve duration apparatus according to an exemplary embodiment of the present invention.

FIG. 7 is a flowchart illustrating a control method using the continuous variable valve duration apparatus according to an exemplary embodiment of the present invention.

As illustrated in FIG. 7, a control method using the continuous variable valve duration apparatus according to an exemplary embodiment of the present invention is a method for preventing knocking of an engine by controlling an effective compression ratio of the engine.

When knocking of an engine is occurred at a step S 100, an electronic control unit (ECU) calculates and learns a target effective compression ratio to can prevent knocking of the engine at a step S110. Herein, the ECU may be a controller 100 as a common system mounted on vehicles to generally control electronic devices in the vehicles and is well known to those skilled in the art, so the detailed description is not provided.

Meanwhile, the learning of the target effective compression ratio is performed through experiments by a person of an ordinary skill in the art before a vehicle is manufactured, and a value of the learned target effective compression ratio may be stored to the controller 100.

If the target effective compression ratio, which is required for preventing knocking according to states of the engine, is calculated at the step S110, the controller 100 maps an effective compression ratio in accordance with a valve duration at a step S120. In addition, the controller 100 sets a target valve duration for realizing the learned target effective compression ratio according to the mapped relation between the valve duration and the effective compression ratio at a step S130.

Meanwhile, the mapping of relation between the duration of the valve 200 and the effective compression ratio is performed through experiments by a person of an ordinary skill in the art before a vehicle is manufactured, and the mapped map about relation between the duration of the valve 200 and the effective compression ratio may be stored to the controller 100.

If the target valve duration is set at the step S130, the controller 100 controls duration of the valve 200 according to the set target valve duration at a step S140. At this time, the controlling of the valve 200 duration is performed as the controller 100 controls the motor 108. Herein, the valve 200, that the duration is controlled, may be an intake valve. In addition, the engine is driven without knocking though states of the engine is rapidly changed as the valve 200 duration is controlled. Furthermore, when the engine enters a normal operation state where knocking is not expected, a control method using a continuous variable valve duration apparatus according to an exemplary embodiment of the present invention is ended at a step S150. Meanwhile, the controller 100 determines the normal operation state of the engine by receiving information about an operation state of the engine.

According to a control method using a continuous variable valve duration apparatus according to an exemplary embodiment of the present invention, an effective compression ratio of an engine can be controlled as duration of a valve lift is controlled by using a continuous variable valve duration apparatus which can adjust duration of the valve lift with a simple configuration in accordance with operational states of an engine.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method using a continuous variable valve duration apparatus which comprises a wheel being mounted on a camshaft and having a wheel key to control duration of an intake valve of an engine, a cam device having a cam and a cam key, being adapted that the camshaft is inserted thereinto, and being disposed to vary relative phase of the cam with respect to the camshaft, an inner bracket being connected with the wheel key and the cam key, a slider housing being adapted that the inner bracket is rotatably inserted thereinto and being disposed to move vertically with respect to the engine, a controller varying a position of the slider housing to adjust rotation center of the inner bracket, and guide device guiding motion of the sliding housing, the control method comprising:

determining and learning a target effective compression ratio of the engine to prevent knocking by the controller when knocking of the engine is occurred;

mapping an effective compression ratio of the engine in accordance with duration of the intake valve by the controller;

setting a target valve duration for realizing the target effective compression ratio by the controller; and controlling duration of the intake valve according to the set target valve duration by the controller.

2. The control method of claim 1, wherein the setting of the target valve duration is performed on a basis of a map about relation between the duration of the intake valve and the effective compression ratio of the engine.

3. The control method of claim 1, wherein the learning of the target effective compression ratio is performed through experiments and the value of the learned target effective compression ratio is stored to the controller.

4. The control method of claim 1, wherein the mapping of relation between the duration of the intake valve and the effective compression ratio of the engine is performed through experiments and the mapped map about the relation between the duration of the intake valve and the effective compression ratio of the engine is stored to the controller.

5. The control method of claim 1, wherein the control method is ended when the engine enters a normal operation state where the knocking is not expected.

* * * * *